US008523287B2

(12) United States Patent
Bowles

(10) Patent No.: US 8,523,287 B2
(45) Date of Patent: Sep. 3, 2013

(54) GUIDANCE SYSTEM FOR A MINING MACHINE

(75) Inventor: Charles Ashenhurst Bowles, Benoni (ZA)

(73) Assignee: Joy MM Delaware, Inc., Wilmington, DE (US)

( * ) Notice: Subject to any disclaimer, the term of this patent is extended or adjusted under 35 U.S.C. 154(b) by 157 days.

(21) Appl. No.: 13/236,961

(22) Filed: Sep. 20, 2011

(65) Prior Publication Data

US 2012/0068523 A1 Mar. 22, 2012

Related U.S. Application Data

(60) Provisional application No. 61/403,817, filed on Sep. 22, 2010.

(51) Int. Cl.
*E21C 35/08* (2006.01)

(52) U.S. Cl.
USPC .......... 299/1.05

(58) Field of Classification Search
USPC .......... 299/1.05, 1.4, 1.3, 1.6
See application file for complete search history.

(56) References Cited

U.S. PATENT DOCUMENTS

| | | | | |
|---|---|---|---|---|
| 2,666,631 A * | 1/1954 | Mavor | .......... | 299/1.6 |
| 3,321,248 A | 5/1967 | Williamson et al. | | |
| 3,462,845 A | 8/1969 | Matthews | | |
| 3,484,136 A | 12/1969 | Colson | | |
| 3,498,673 A * | 3/1970 | Coski et al. | .......... | 299/1.3 |
| 3,517,966 A | 6/1970 | Montacie | | |
| 3,560,753 A | 2/1971 | Beug | | |
| 3,619,069 A | 11/1971 | Alexander | | |
| 3,707,330 A | 12/1972 | Pine | | |
| 4,027,210 A | 5/1977 | Weber | | |
| 4,047,763 A | 9/1977 | Gilliland et al. | | |
| 4,111,486 A | 9/1978 | Kumaki et al. | | |
| 4,273,468 A | 6/1981 | Cyfka | | |
| 4,323,280 A | 4/1982 | Lansberry et al. | | |
| 4,390,212 A | 6/1983 | Nitzberg | | |
| 4,392,744 A | 7/1983 | Tatsuhama et al. | | |
| 4,446,626 A | 5/1984 | Grender et al. | | |
| 4,557,524 A | 12/1985 | Melhuish | | |
| 4,714,344 A | 12/1987 | Hamar | | |

(Continued)

OTHER PUBLICATIONS

PCT/US2011/052287 International Search Report dated Jan. 17, 2012 (5 pages).

(Continued)

*Primary Examiner* — John Kreck

(74) *Attorney, Agent, or Firm* — Michael Best & Friedrich LLP

(57) ABSTRACT

A guidance system for mining a seam of material includes a mining machine, a carriage, and a guide assembly. The mining machine includes a cutter head and defines a roll axis, a pitch axis, and a yaw axis. The carriage includes a first emitter, a second emitter, and a third emitter. The first emitter projects a first laser that is aligned with a seam plane. The second emitter projects a second laser, and the third emitter projects a third laser. The guide assembly includes a first indicator and a target. The first indicator is aligned with the second laser, and the target is aligned with the third laser. The relative positions of the first indicator with respect to the second laser and the target with respect to the third laser indicate the orientation of the roll axis, pitch axis, and yaw axis relative to the seam plane.

16 Claims, 8 Drawing Sheets

(56) References Cited

U.S. PATENT DOCUMENTS

| | | | | |
|---|---|---|---|---|
| 4,715,657 | A | 12/1987 | Sato et al. | |
| 4,856,384 | A | 8/1989 | Wechner | |
| 4,884,847 | A | 12/1989 | Bessinger et al. | |
| 4,932,481 | A | 6/1990 | Wechner | |
| 5,186,579 | A | 2/1993 | Hanamoto et al. | |
| 5,237,384 | A * | 8/1993 | Fukunaga et al. | 356/139.06 |
| 5,295,073 | A | 3/1994 | Celette | |
| 5,501,548 | A | 3/1996 | Hayashi et al. | |
| 5,529,437 | A * | 6/1996 | Filipowski et al. | 405/143 |
| 5,553,925 | A | 9/1996 | Merten et al. | |
| 6,203,111 | B1 | 3/2001 | Ollis et al. | |
| 6,725,551 | B1 * | 4/2004 | Sutton | 33/286 |
| 7,434,322 | B2 * | 10/2008 | Walser et al. | 33/286 |
| 7,990,550 | B2 * | 8/2011 | Aebischer et al. | 356/614 |
| 8,157,330 | B2 | 4/2012 | Niederriter | |

OTHER PUBLICATIONS

PCT/US2011/052287 International Written Opinion dated Jan. 17, 2012 (5 pages).

* cited by examiner

GUIDANCE SYSTEM FOR A MINING MACHINE

CROSS-REFERENCE TO RELATED APPLICATIONS

This application claims the benefit of U.S. Provisional Application 61/403,817, filed Sep. 22, 2010, the entire contents of which are incorporated herein by reference.

BACKGROUND

The present invention relates to mining equipment, and in particular to an underground continuous mining machine.

Remote-controlled continuous mining machines are generally operated by an off-board human operator using a remote control device. The operator is positioned behind the machine and directs operation of the machine by sight. The operator must insure that the mining machine is aligned with the mineral seam, or reef, at all times since it is difficult to rectify the machine's orientation once it deviates. In many circumstances, the reef varies in three dimensions, making it difficult for the mining machine to follow the seam.

SUMMARY OF THE INVENTION

In one embodiment, the invention provides a guidance system for mining a seam of material, the seam of material defining a seam plane, the guidance system comprising a mining machine, a carriage, and a guide assembly. The mining machine includes a cutter head and defines a roll axis extending the length of the machine, a pitch axis extending from one side of the machine to the other side, and a yaw axis extending from a top side of the machine to the bottom side. The carriage includes a first emitter, a second emitter, and a third emitter. The first emitter projects a first laser that is aligned with the seam plane, the second emitter projects a second laser, and the third emitter projects a third laser. The guide assembly includes a first indicator and a target. The first indicator is aligned with the second laser, and the target is aligned with the third laser. The relative positions of the first indicator with respect to the second laser and the target with respect to the third laser indicate the orientation of the roll axis, pitch axis, and yaw axis relative to the seam plane.

In another embodiment, the invention provides a laser emitter carriage for guiding a machine during mining of a mineral seam. The mineral seam defines a seam plane. The laser emitter assembly includes a base, a first emitter, and a second emitter. The first laser emitter is coupled to the base and emits a first planar laser that is aligned with the seam plane. The second laser emitter is coupled to the base and emits a second planar laser for aligning a mining machine.

In yet another embodiment, the invention provides a method for guiding a mining machine during mining of a mineral seam. The mining machine including a first end includes a cutter head and a second end, and the mineral seam defines a seam plane, the method includes: providing a first laser, a second laser, and a third laser; providing a first indicator positioned on the second end of the machine and a target positioned adjacent the machine; aligning the first laser with the seam plane; aligning the second laser with the first indicator; aligning the third laser with the target; and operating the machine to mine material in the seam such that the first indicator remains aligned with the second laser and the target remains aligned with the third laser.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
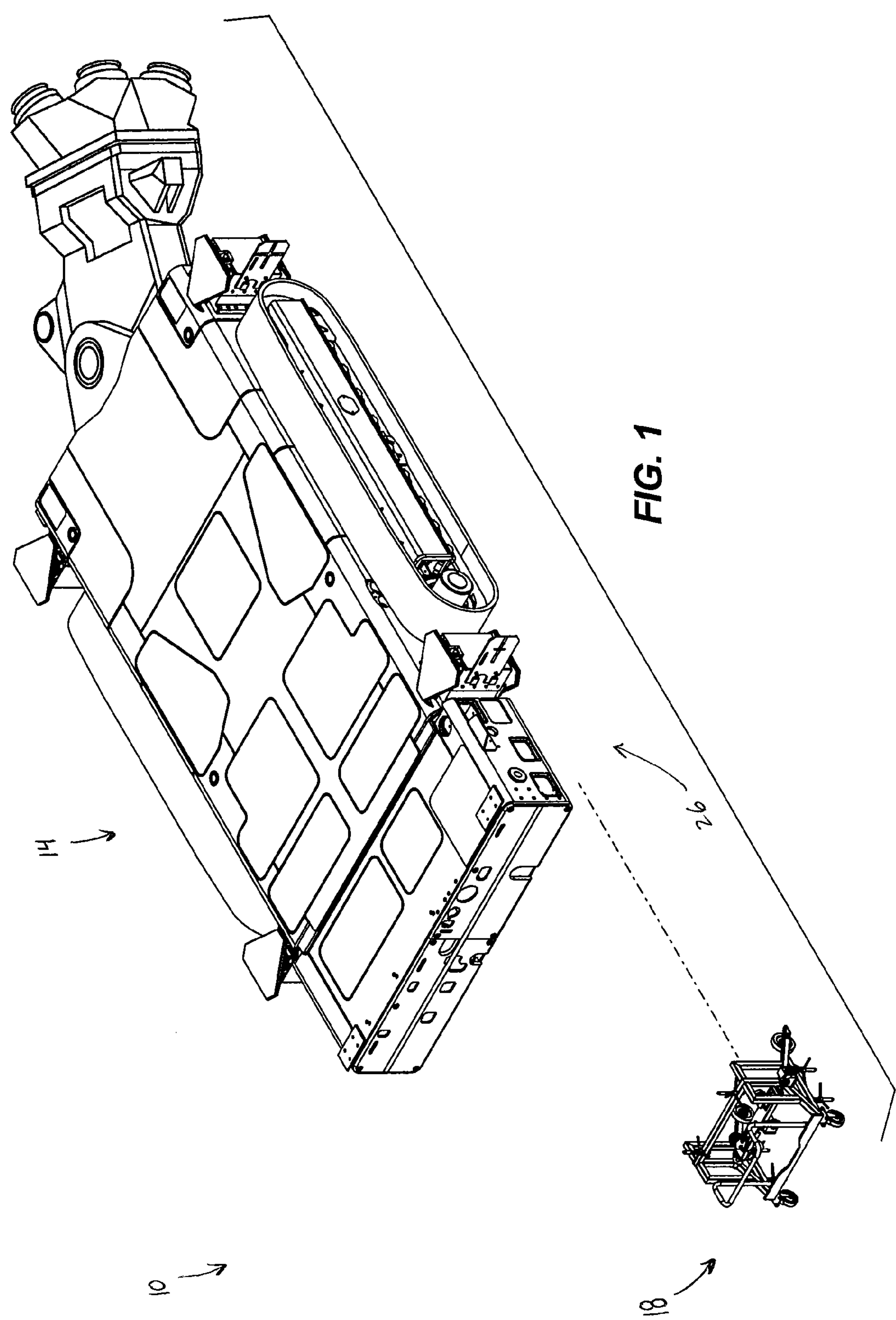
FIG. 1 is a perspective view of a guidance system according to one embodiment of the invention
Figure 2:
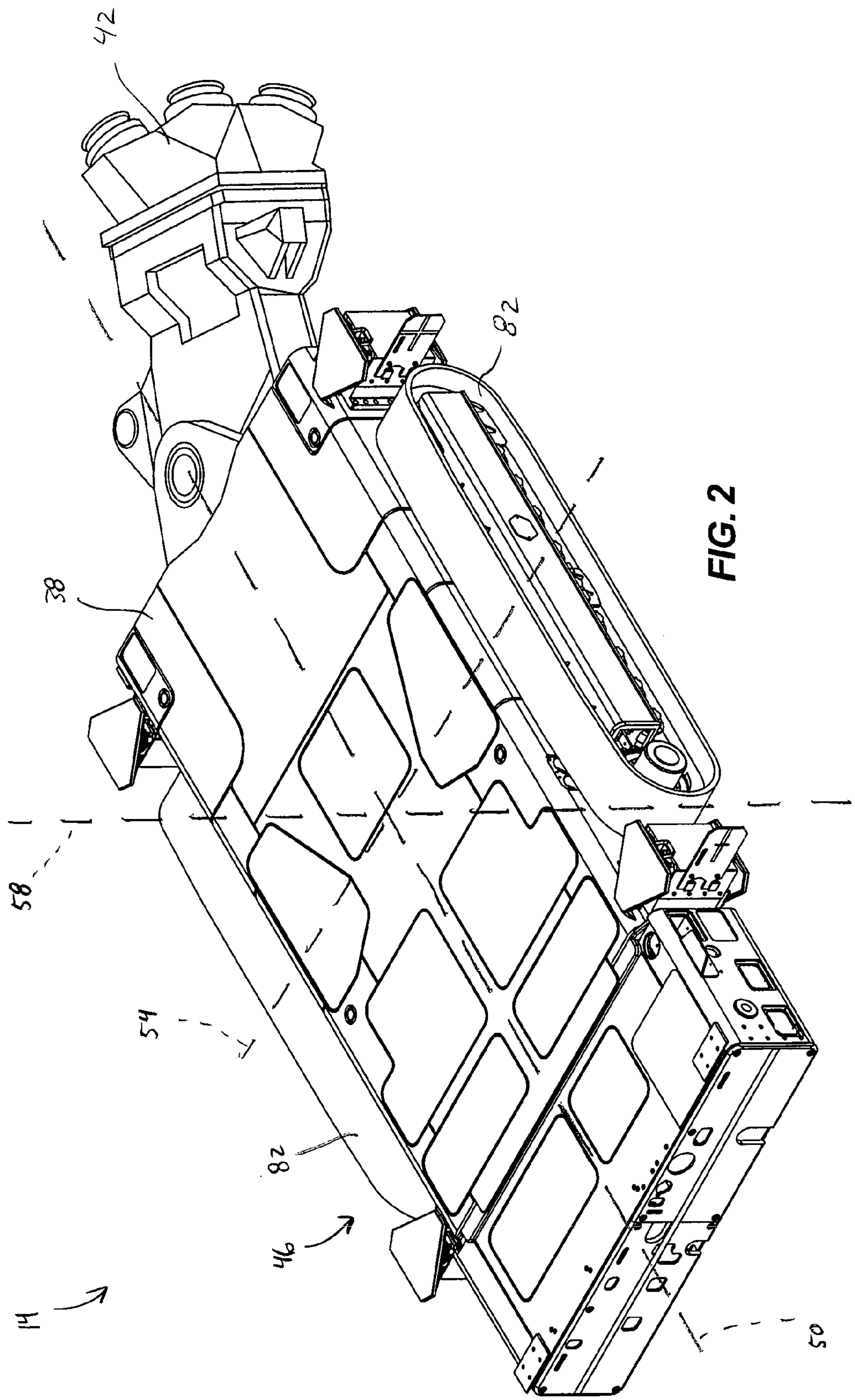
FIG. 2 is a perspective view of a mining machine.
Figure 8:
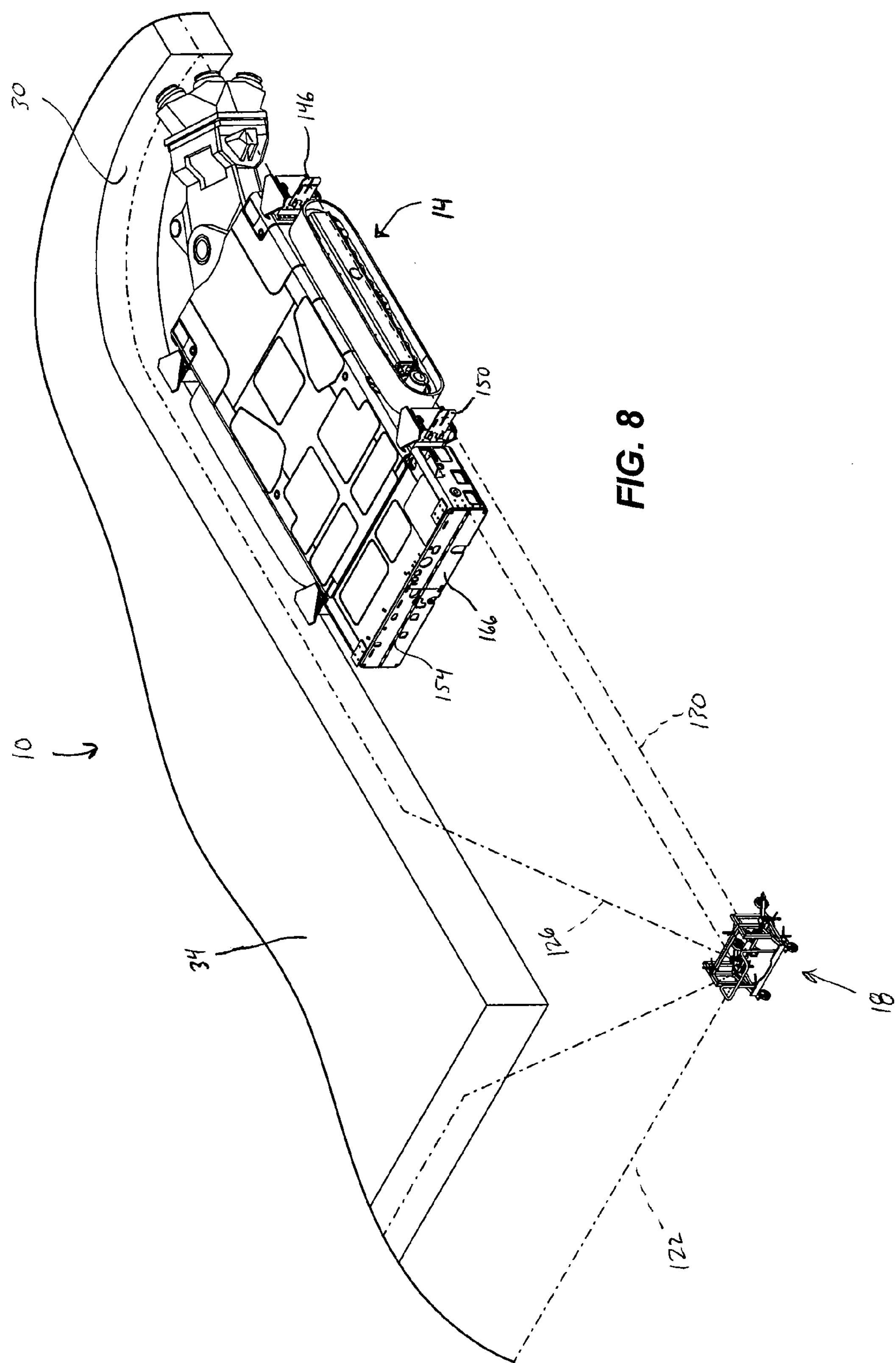
FIG. 8 is a perspective view of the guidance system of FIG. 1.

FIG. 1 shows a mining guidance system 10 including a continuous mining machine 14, a laser emitter trolley or carriage 18, and a guide assembly 26 coupled to the continuous mining machine 14. The mining machine 14 engages a work face 30 of a mineral seam 34 (FIG. 8). As shown in FIG. 2, the mining machine 14 includes a body 38, a cutter head 42 coupled to the body 38, and a drive system 46 for moving the body 38. The body 38 defines a roll axis 50, a pitch axis 54, and a yaw axis 58. The roll axis 50 extends longitudinally through the body 38. The pitch axis 54 extends transversely through the body 38, and the yaw axis 58 extends vertically through the body 38. In the illustrated embodiment, the drive system 46 includes a pair of tracks 82 on either side of the body 38. Other embodiments may use wheels to move the machine 14.

Figure 3:
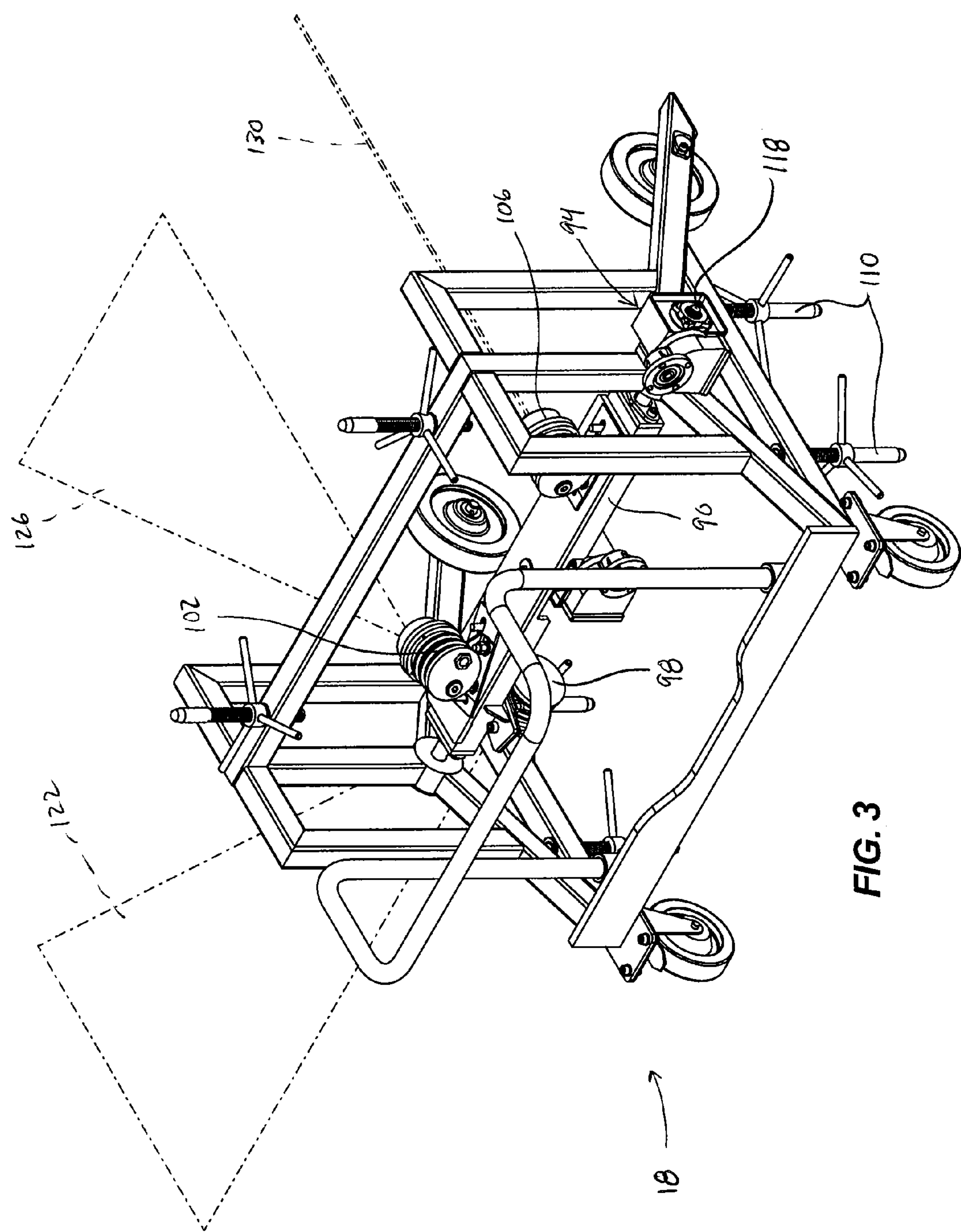
FIG. 3 is a perspective view of a laser emitter carriage.

As shown in FIG. 3, the laser emitter carriage 18 includes a base 90, an adjustment assembly 94, a first laser emitter 98, a second laser emitter 102, and a third laser emitter 106. The base 90 includes four wheels for moving the carriage 18 and multiple set screws 110 for securing the carriage 18 with respect to a mine floor. The adjustment assembly 94 includes a gearbox 118 for pivoting each of the laser emitters 98, 102, 106 with respect to the base 90. In the illustrated embodiment, the first laser emitter 98 projects a first planar laser 122. The first planar laser 122 extends toward the seam 34 in a planar manner. The second laser emitter 102 projects a second planar laser 126 extending toward the work face 30 of the seam 34. The third laser emitter 106 projects a laser beam 130 that extends toward the work face 30. The adjustment assembly 94 permits each laser emitter 98, 102, 106 to pivot in 3 dimensions, allowing the operator to position the planar lasers 122, 126 and the laser beam 130 with high precision. In one embodiment, the laser emitters 98, 102, 106 can be accurately adjusted for distances of up to 100 meters.

Figure 4:
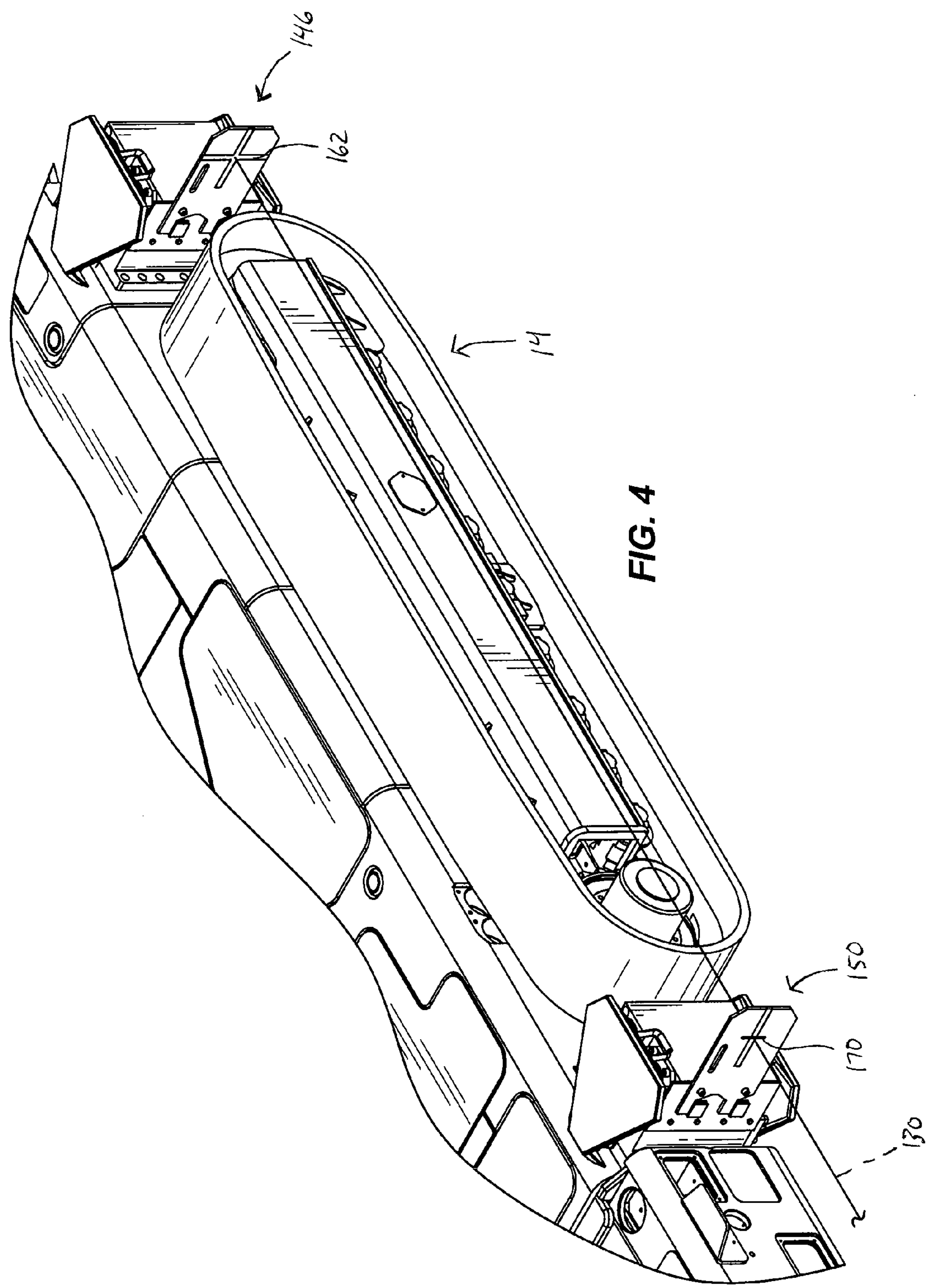
FIG. 4 is an enlarged perspective view of a right side of the mining machine of FIG. 2.
Figure 6:
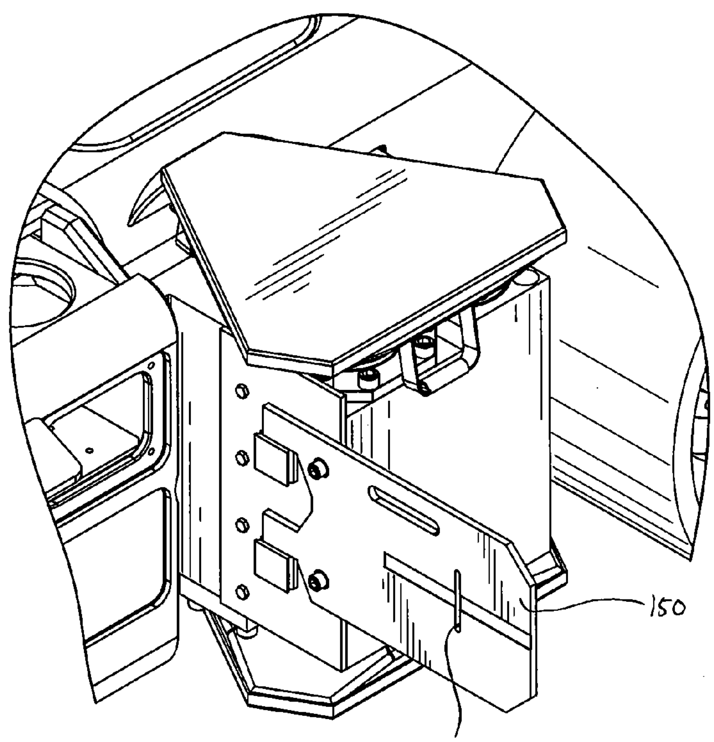
FIG. 6 is a perspective view of a second target.
Figure 5:
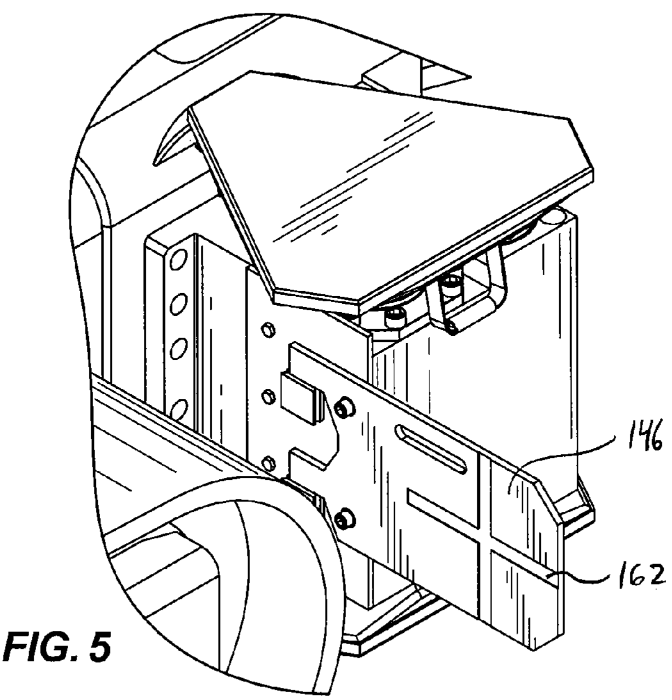
FIG. 5 is a perspective view of a first target.
Figure 7:
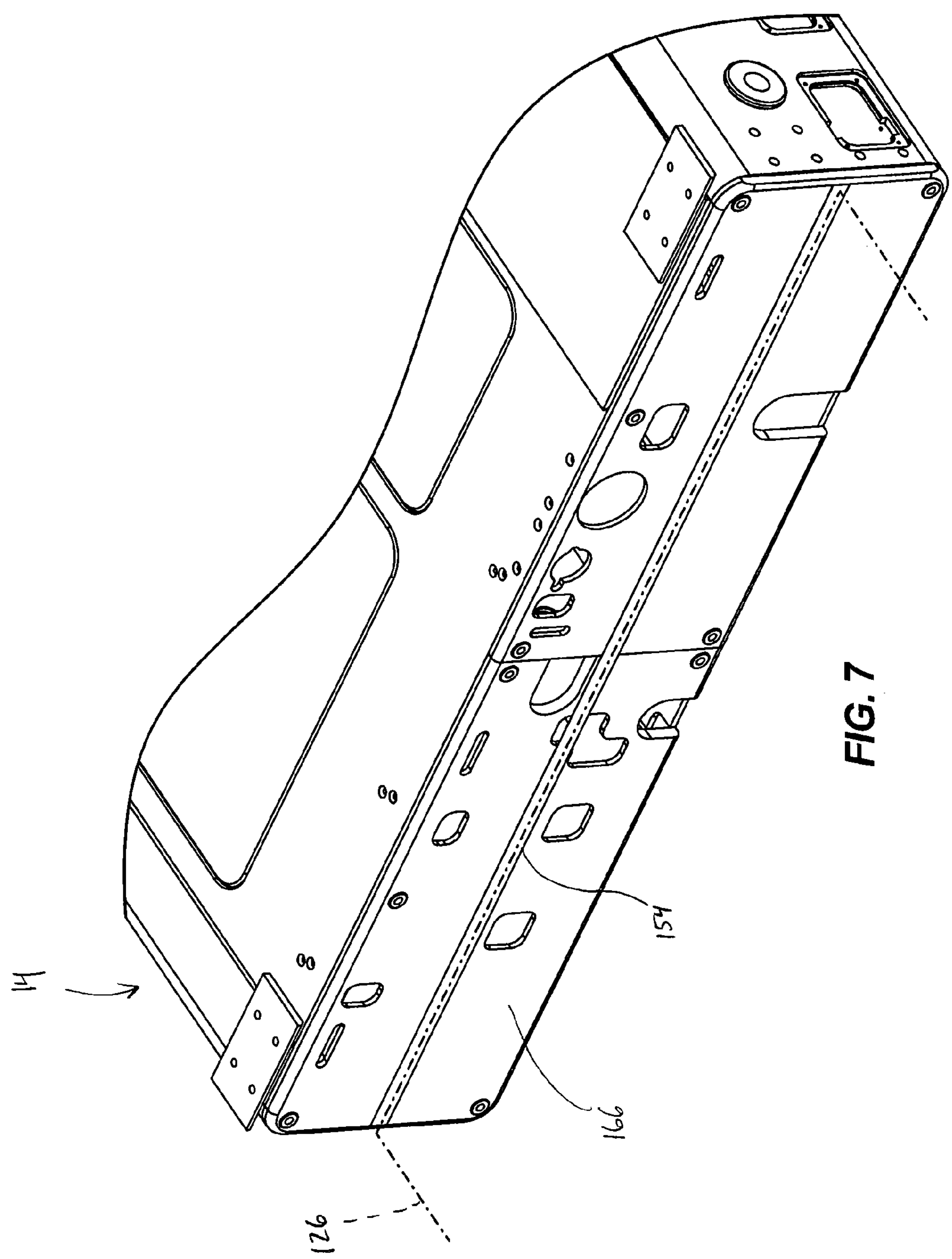
FIG. 7 is a perspective view of a rear indicator.

As shown in FIGS. 4-7, the guide assembly 26 includes a first target 146 (FIG. 4), a second target 150 (FIG. 4), and a level indicator 154 (FIG. 7). Referring to FIGS. 4 and 5, the first target 146 is coupled to the mining machine 14 on one side of the mining machine 14. The first target 146 extends away from the machine 14 and includes a cross-hair indicator 162. Referring to FIGS. 4 and 6, the second target 150 is coupled to the mining machine 14. The second target 150 is aligned with the first target 146 and includes a vertical slot 170. In the illustrated embodiment, both targets 146, 150 are mounted on the right side of the machine 14, with the first target 146 being positioned proximate the cutter head and the second target being positioned proximate the end 166 opposite the cutter head 42. As shown in FIG. 7, the level indicator 154 is positioned on the end 166 of the mining machine 14 and is formed as a linear marker extending across the end 166 of the machine 14. In other embodiments, the first target 146 and second target 150 may be mounted in other positions with respect to the machine 14, and the targets 146, 150 and level indicator 154 may include other marker configurations.

FIG. 8 shows the guidance system 10 in operation. The carriage 18 is positioned behind the mining machine 14 and the work face 30 of the seam 34. The carriage 18 is secured in place by inserting the set screws 110 into the mine floor. The first planar laser 122 is aligned with the effective mean of the seam 34. The effective mean is the plane that permits the optimum mine yield to be extracted by the mining operation. The method for identifying the effective mean is known by persons of ordinary skill in the art, and is further description of this feature is not necessary. The second planar laser 126 is aligned with the level indicator 154, and the laser beam 130 is aligned to pass through the vertical slot 170 (FIG. 4) of the second target 150 and hit the cross-hair indicator 162 (FIG. 4) on the first target 146. The mining machine 14 is then trammed into position adjacent the work face 30 and commences extracting material from the work face 30.

As the mining machine 14 proceeds through the seam 34, the operator monitors the three laser projections 122, 126, and 130 to insure that each remains aligned so that the machine 14 extracts the optimum yield. Maneuvering the machine 14 by a remote control, the operator refers to the position of the laser projections 122, 126, and 130 as guides for adjusting the position and orientation of the machine 14. During advance and before commencing the subsequent cutting sequence, the positions of the laser projections 122, 126, and 130 are checked and, if required, the orientation of the mining machine 14 is adjusted to ensure accurate direction control and positioning is maintained.

Figure 9:
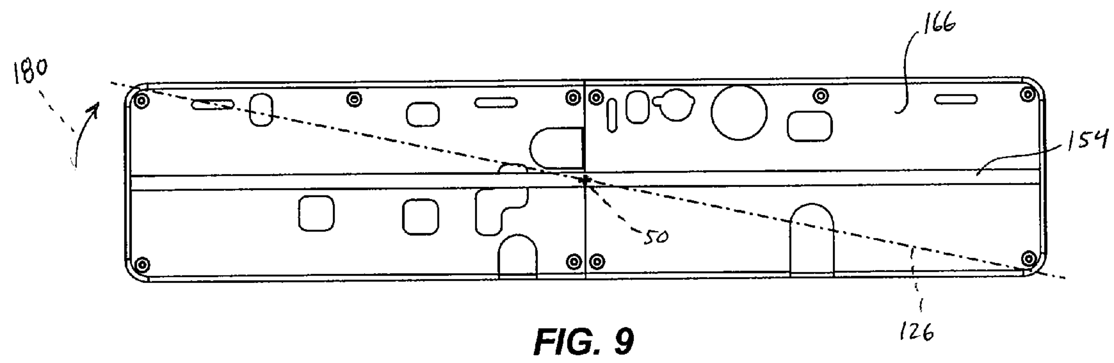
FIG. 9 is a rear view of an end of the mining machine of FIG. 2.

Observation of the second planar laser 126 on the level indicator 154 provides information regarding the orientation of the mining machine 14 with respect to the roll axis 50. For example, if the left side of the machine 14 dips below the second planar laser 126 as shown in FIG. 9, the operator maneuvers the mining machine 14 to raise the left side. This action rotates the machine 14 in the direction 180 until the second planar laser 126 is aligned with the level indicator 154.

Figure 10:
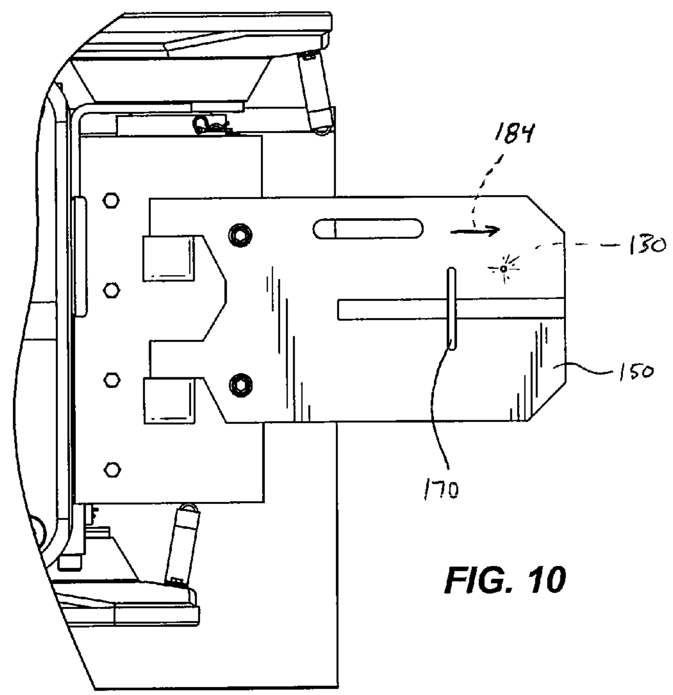
FIG. 10 is a rear view of the second target of FIG. 6.

Observation of the laser beam 130 on the first target 146 and the second target 150 provides information regarding the orientation of the machine 14 with respect to the pitch axis 54 (FIG. 2) and the yaw axis 58 (FIG. 2). If the machine 14 is out of position the laser beam 130 will shine onto the second target 150, indicating how to correct the orientation of the mining machine 14. For instance, referring to FIG. 10, if the laser beam 130 is located in the top right corner of the second target 150, the operator steers the machine 14 to the left. This movement causes the second target 150 to move in the direction 184 until the laser beam 130 is aligned with the vertical slot 170. If the laser beam 130 then shines on the first target 146 and is above the center of the cross-hair indicator 162, the operator angles the front of the machine 14 upward. This action moves the first target 146 upward with respect to the laser beam 130. When the laser beam 130 shines through the vertical slot 170 of the second target 150 and hits the center of the cross-hair indicator 162, the mining machine 14 is aligned and the mining operation proceeds. The distance of the third laser emitter 106 from the open face determines the width of the cut.

After a cut is made, the laser emitters 98, 102, 106 are moved or adjusted again to provide a guide for the next phase of the mining operation. By establishing an alignment between the laser projections 122, 126, 130 and the guide assembly 26, the guidance system 10 insures that mining machine 14 remains "on seam", or aligned with the effective mean of the mineral seam 34, even if the seam 34 is inclined at an angle.

Thus, the invention provides, among other things, a guidance system for a mining machine. Various features and advantages of the invention are set forth in the following claims.

What is claimed is:

1. A guidance system for mining a seam of material, the seam of material defining a seam plane, the guidance system comprising:

a mining machine including a cutter head, the mining machine defining a roll axis extending the length of the machine, a pitch axis extending from one side of the machine to the other side, and a yaw axis extending from a top side of the machine to the bottom side;

a carriage including a first emitter, a second emitter, and a third emitter, the first emitter projecting a first laser that is aligned with the seam plane, the second emitter projecting a second laser, and the third emitter projecting a third laser; and a guide assembly including a first indicator and a target, the first indicator being aligned with the second laser, the target being aligned with the third laser, wherein the relative positions of the first indicator with respect to the second laser and the target with respect to the third laser indicate the orientation of the roll axis, pitch axis, and yaw axis relative to the seam plane.

2. The guidance system of claim 1, wherein the first target is coupled to a rear end of the machine.

3. The guidance system of claim 2, wherein the second laser is a planar laser extending toward the mining machine and the first indicator extends in a direction parallel to the pitch axis, and the roll axis of the mining machine is aligned with respect to seam plane when the second laser is aligned with the first indicator.

4. The guidance system of claim 1, the target including a first member and a second member, the first member including a second indicator, the second member including a slot, wherein the first member is coupled to the machine proximate the cutter head and the second member is coupled to the machine and positioned away from the cutter head.

5. The guidance system of claim 4, wherein the pitch axis and the yaw axis are aligned with the seam plane when the third laser passes through the slot of the second member and is aligned with the second indicator.

6. The guidance system of claim 1, the carriage further including an adjustment mechanism for changing the orientation of the first emitter, the second emitter, and the third emitter.

7. The guidance system of claim 1, the carriage including a set screw for securing the carriage with respect to a mine floor.

8. A laser emitter carriage for guiding a machine during mining of a mineral seam, the mineral seam defining a seam plane, the laser emitter assembly comprising:

a base;

a first laser emitter coupled to the base, the first laser emitter emitting a first planar laser that is aligned with the seam plane; and a second laser emitter coupled to the base, the second laser emitter emitting a second planar laser for aligning a mining machine.

9. The laser emitter carriage of claim 8, further comprising an adjustment mechanism for changing the orientation of the first emitter and second emitter.

10. The laser emitter carriage of claim 8, the base further including at least one set screw for anchoring the carriage with respect to the mine floor.

11. The laser emitter carriage of claim 8, further comprising a third laser emitter coupled to the base.

12. The laser emitter carriage of claim 11, wherein the third laser emitter emits a laser beam.

13. A method for guiding a mining machine during mining of a mineral seam, the mining machine including a first end including a cutter head and a second end, the mineral seam defining a seam plane, the method comprising:

providing a first laser, a second laser, and a third laser;

providing a first indicator positioned on the second end of the machine and a target positioned adjacent the machine;

aligning the first laser with the seam plane;

aligning the second laser with the first indicator;

aligning the third laser with the target; and operating the machine to mine material in the seam such that the first indicator remains aligned with the second laser and the target remains aligned with the third laser.

14. The method of claim 13, wherein the first laser is a planar laser.

15. The method of claim 13, wherein the second laser is a planar laser and the first indicator is a linear marker extending laterally across the second end of the machine.

16. The method of claim 13, wherein aligning the third laser includes passing the third laser through a first member and such that it hits a second member, the second member including a second indicator.

* * * * *